United States Patent
Akimoto et al.

(10) Patent No.: US 6,225,461 B1
(45) Date of Patent: May 1, 2001

(54) CELLULOSE MICROSPHERES AND METHOD OF MANUFACTURING THE SAME

(75) Inventors: Kyoko Akimoto; Hidenao Saito; Norio Ise, all of Fukui (JP)

(73) Assignee: Rengo Co., Ltd., Osaka (JP)

( * ) Notice: Subject to any disclaimer, the term of this patent is extended or adjusted under 35 U.S.C. 154(b) by 0 days.

(21) Appl. No.: 09/208,420

(22) Filed: Dec. 10, 1998

(30) Foreign Application Priority Data

Dec. 17, 1997 (JP) ................................. 9-364484

(51) Int. Cl.$^7$ ............................. C07B 16/00; C07B 37/00
(52) U.S. Cl. ............................... 536/56; 536/57; 536/124
(58) Field of Search ......................... 536/56, 57, 124

(56) References Cited

U.S. PATENT DOCUMENTS

| | | | |
|---|---|---|---|
| 4,664,105 | 5/1987 | Dautzenberg et al. | 128/156 |
| 5,026,841 | * 6/1991 | Francotte et al. | 536/58 |
| 5,244,734 | * 9/1993 | Okuma et al. | 428/402 |

FOREIGN PATENT DOCUMENTS

| | | |
|---|---|---|
| 300937 | * 9/1992 | (DD) . |
| 0 850 979 | 7/1998 | (EP) . |
| 55-39565 | 10/1980 | (JP) . |
| 56-21761 | 5/1981 | (JP) . |
| 57-45254 | 9/1982 | (JP) . |
| 63-090501 | * 4/1988 | (JP) . |
| 4-41533 | 2/1992 | (JP) . |
| 5-200268 | 8/1993 | (JP) . |
| 5-76496 | 10/1993 | (JP) . |
| 06254373 | * 9/1994 | (JP) . |
| 09176327 | * 7/1997 | (JP) . |

* cited by examiner

Primary Examiner—Gary Geist
Assistant Examiner—Leigh C. Maier
(74) Attorney, Agent, or Firm—Wenderoth, Lind & Ponack L.L.P.

(57) ABSTRACT

A method of manufacturing cellulose microspheres is proposed which is high in productivity, and takes into consideration the safety and environmental aspects. The cellulose microspheres are manufactured by mixing at least three parts by weight of a water-soluble polysaccharide with an alkaline cellulose solution containing one part by weight of cellulose to prepare a minute dispersion in which are formed minute droplets made of cellulose-rich phase, and coagulating and regenerating the minute droplets.

4 Claims, 2 Drawing Sheets

CELLULOSE MICROSPHERES AND METHOD OF MANUFACTURING THE SAME

BACKGROUND OF THE INVENTION

This invention relates to cellulose microspheres and a method of manufacturing them.

Particles of cellulose and its derivatives (hereinafter referred to as "cellulose particles") are used as ion exchangers, packing materials for chromatography, adsorbents for metal or protein, additives for cosmetics, carriers for immobilization of biocatalysts and for a variety of other purposes.

Cellulose particles are manufactured in many different ways, which are roughly divided into physical and chemical methods.

In one physical method, viscose is extruded from a discharge nozzle so that its flow will change from a continuous flow to a droplet flow while dropping, and dropped into a coagulating/regenerating bath in the form of substantially spherical droplets to manufacture regenerated cellulose particles having a particle size of 16–170 mesh (88–1168 µm) (examined Japanese patent publication 56-21761).

In another prior method, cellulose particles are manufactured by spraying viscose into hot air to dry it by use of an atomizer such as a twin-fluid atomizer or a rotary nozzle (unexamined Japanese patent publication 4-41533).

Chemical methods include one comprising the steps of suspending viscose in a water-immiscible solvent such as chlorobenzene, solidifying it by heating to a temperature of 30–100° C. while continuously stirring the suspension, and acid-treating the thus formed particles to manufacture cellulose particles having a particle size of 80–1000 µm (examined Japanese patent publication 57-45254).

Also disclosed is a method comprising the steps of dispersing viscose in a water-immiscible solvent such as cyclohexane, preparing a stable W/O type viscose emulsion using a surfactant, and reacting the emulsion with a W/O type emulsion of coagulating solution prepared by adding a coagulating solution and a surfactant to a water-immiscible solvent by mixing them together, or blowing an acid gas into the W/O type viscose emulsion or directly adding a coagulating solution into the W/O type viscose emulsion to manufacture cellulose particles having a mean particle size of 15 µm or less (unexamined Japanese patent publication 5-200268).

There is another method comprising the steps of cutting filaments of cellulose triacetate manufactured by dry spinning from a methylene chloride or chloroform solution of cellulose triacetate into chips, heating the chips in such a medium as silicone oil to melt them, and saponifying them to manufacture cellulose particles having a particle size of 30 to 500 µm (examined Japanese patent publication 55-39565).

Another prior art method comprises the steps of preparing a dispersion of minute viscose droplets by dispersing viscose in an aqueous solution containing a water-soluble anionic polymer, coagulating the particles by heating the dispersion or mixing a viscose coagulant, and regenerating the cellulose particles with an acid to manufacture cellulose particles having a mean particle size of 20 µm or less (examined Japanese patent publication 5-76496).

The abovesaid physical methods can be carried out using devices having a simple structure and permit continuous production, but have a problem in that it is difficult to obtain spherical particles because a large amount of particles of indeterminate form are produced in a sprayed state in which droplets of a cellulose solution are dispersed in an air flow, that air bubbles tend to mix into the cellulose particles and that the particle size distribution tends to be large.

In chemical methods in which a water-immiscible solvent is used, the steps of removing the water-immiscible solvent and washing the cellulose particles are needed to separate the particles formed. Further, since an organic solvent is used as the water-immiscible solvent, these methods are undesirable from safety, environmental and economical viewpoints.

On the other hand, the method in which chips of cellulose triacetate are melted needs many steps such as melting and spinning cellulose triacetate, cutting it into chips, and melting the chips. Also, the manufacturing efficiency is thus low.

Further, in a method in which a cellulose-rich phase is separated as droplets from a liquid mixture of viscose and a water-soluble anionic polymer by the interaction of both components, no complete phase separation occurs, i.e. the mixture never separates into one phase containing cellulose only and another containing water-soluble anionic polymer only. Rather, the mixture is simply separated into a cellulose-rich phase and an anionic polymer-rich phase under a specific partition coefficient. Thus, there remain water-soluble anionic polymers in the cellulose particles obtained. From the fact that regenerated cellulose membranes are used as dialysis membranes, it is apparent that it is difficult to remove any water-soluble anionic synthetic polymers, which are high in average molecular weight, from the cellulose particles by washing.

An object of this invention is to provide a method of manufacturing cellulose microspheres which is free of these problems and high in productivity, and which takes into consideration the safety and environmental aspects.

SUMMARY OF THE INVENTION

According to this invention, there is provided a method of manufacturing cellulose microspheres having a particle size of 1–100 µm, the method comprising the steps of mixing an alkaline cellulose solution with a water-soluble polysaccharide so that the mixture will contain at least three parts by weight of a water-soluble polysaccharide and an alkaline cellulose solution containing one part by weight of cellulose content to prepare a minute dispersion in which are formed minute droplets made of cellulose-rich phase and coagulating and regenerating the minute droplets.

The total concentration of the cellulose content in the alkaline cellulose solution and the water-soluble polysaccharide should be 5–30 wt %. The alkaline cellulose solution may be viscose.

At a concentration higher than a specific level, miscibility between the alkaline cellulose solution and the water-soluble polysaccharide is so low as to cause phase separation under a specific partition coefficient. Thus, if a water-soluble polysaccharide is mixed with an alkaline cellulose solution to give a ratio of at least three parts by weight of the water-soluble polysaccharide to one part by weight of cellulose content in the alkaline cellulose solution, cellulose-rich phase will disperse as minute droplets to polysaccharide-rich phase as a medium. The minute droplets of the cellulose-rich phase will be spherical in a dispersed state. Cellulose microspheres close to true spheres can be obtained by coagulating and regenerating the minute droplets.

Because the cellulose-rich phase and the water-soluble polysaccharide-rich phase are separated under a specific partition coefficient, minute droplets of the alkaline cellulose-rich solution contain water-soluble polysaccharide. By coagulating and regenerating the minute droplets with an acid, the water-soluble polysaccharide will be acid-hydrolyzed to low-molecular monomer or oligomer. Thus it becomes easier to remove.

Other features and objects of the present invention will become apparent from the following description made with reference to the accompanying drawings, in which:

DETAILED DESCRIPTION OF THE PREFERRED EMBODIMENT

Figure 1:
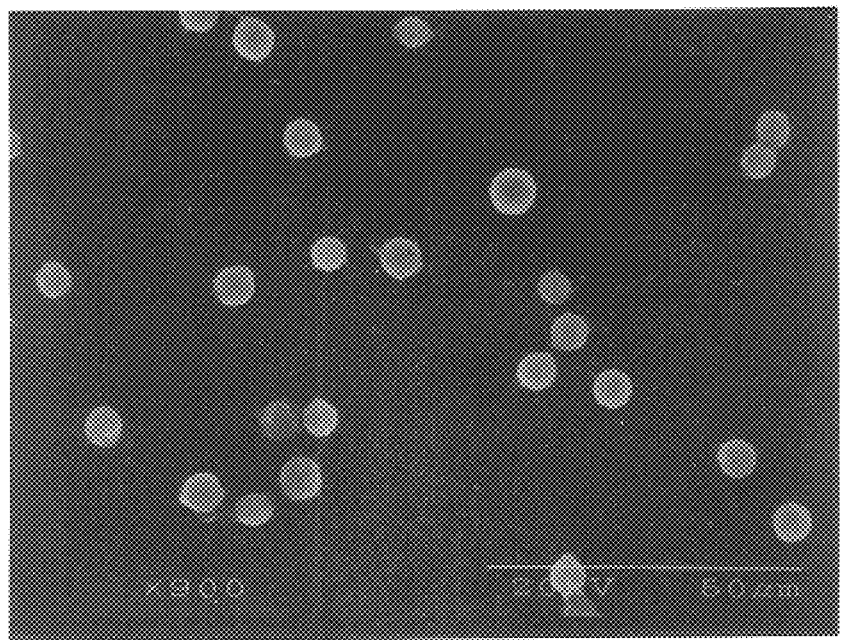
FIG. 1 is a scanning electron micrograph (×900) of cellulose microspheres obtained in Example 1.

Cellulose microspheres according to this invention are spherical particles having a particle size of 1–100 μm and a degree of circularity of 0.90–1.00.

The degree of circularity is an index indicating how much the particle is close to true sphere. Specifically, the degree of circularity is measured by taking an electron micrograph of a particle, and calculating the ratio of the circumference of a circle having the same area as the projected area of the particle to the actual circumference of the two-dimensional picture of the particle. If the degree of circularity of a single particle is measured, this means that the degree of circularity as viewed from only one direction is measured. But by measuring the degrees of circularity of a sufficient number of particles and averaging the measured degrees of circularity, it is possible to determine how close the particles are to the true sphere.

A method of manufacturing such cellulose microspheres according to the present invention is described below.

A minute dispersion in which are formed minute droplets comprised of a cellulose-rich phase is prepared by mixing an alkaline cellulose solution and a water-soluble polysaccharide. The alkaline cellulose solution is a solution in which a cellulose is dissolved in form of a derivative or a metal complex in alkaline aqueous medium. Specifically, it may be viscose, cellulose cuprammonium solution, or cellulose carbamate solution. Among them, viscose is preferable, and viscose used for the manufacture of cellophane is more preferable.

The polysaccharide is not limited in kind provided it is alkali-soluble, easily acid-hydrolyzable, and easily phase-separable when mixed with an alkaline cellulose solution. Such polysaccharides include starch, its derivatives, pullulan, dextran or gum arabic. Among them, starch or its derivatives are easily available. Starch or its derivatives may be ones derived from wheat, potato, corn, tapioca, or else. Chemically, physically or biologically modified starch may be used, too. Modified starch includes starch hydrolyzates such as dextrin, acid-treated starch, oxidized starch or dialdehyde starch; starch ethers such as carboxymethylated starch or hydroxyethylated starch; starch esters such as monostarch phosphate or acetylated starch; physically modified starch such as pregelatinized starch or heat-moisture treated starch; or enzyme-treated starch such as amylose.

The alkaline cellulose solution and the water-soluble polysaccharide are mixed together so that the mixing ratio of the water-soluble polysaccharide to cellulose should be at least three parts by weight, more preferably 5–30 parts by weight, to one part by weight of the cellulose content in the alkaline cellulose solution. If the ratio of polysaccharide to cellulose is too low, large particles or particles of indeterminate form tend to form. If the ratio is too high, it is difficult to produce cellulose microspheres with a small particle size distribution. Also, production efficiency becomes low.

The total concentration of the cellulose content in the alkaline cellulose solution and the water-soluble polysaccharide in the minute dispersion should preferably be 5–30 wt %. If the total concentration is lower than 5 wt %, particles of indeterminate form tend to form. If higher than 30 wt %, the viscosity of the minute dispersion tends to be too high to agitate efficiently, thus making the formation of particles difficult.

Method for mixing the alkaline cellulose solution and the water-soluble polysaccharide is not limited. For example, water-soluble polysaccharide dissolved in water or an alkaline solution may be added to an alkaline cellulose solution, or water-soluble polysaccharide in a solid form may be added to an alkaline cellulose solution. The order of addition may be reverse to above. After mixing, the mixture may be stirred mechanically by use of an ordinary stirrer or mixer. The stirring speed has to be sufficiently high. If the stirring speed is not high enough, the number of particles of indeterminate form tends to increase, or the particle size distribution of the cellulose microspheres tends to widen.

At a concentration higher than a certain level, miscibility between a cellulose derivative or metal complex in the alkaline cellulose solution and the water-soluble polysaccharide in solution tends to be so low as to cause phase separation under a specific partition coefficient. Thus, as soon as the alkaline cellulose solution and the water-soluble polysaccharide are mixed together at a predetermined ratio and stirred, phase separation to cellulose-rich phase and polysaccharide-rich phase will occur. The cellulose-rich phase, which is lower in content, will disperse in the form of minute droplets. In a dispersed state, the minute droplets of the cellulose-rich phase become spherical. Thus, cellulose microspheres close in shape to true spheres can be obtained by coagulation and regeneration, which will be described below.

The shape and particle size of the minute droplets, i.e. the shape and particle size of the cellulose microspheres obtained by the below-described coagulation and regeneration can be controlled by adjusting the combination of an alkaline cellulose solution and a water-soluble polysaccharide, the mixing ratio of the cellulose content of the alkaline cellulose solution and the water-soluble polysaccharide, their total concentration and the stirring conditions of the minute dispersion of the alkaline cellulose solution and the water-soluble polysaccharide, etc. The particle size obtained by this method is 1–100 μm. Particles of less than 1 μm are rarely obtained. Particles larger than 100 μm are not preferable because such particles tend to be low in the degree of circularity.

Since the alkaline cellulose solution and the water-soluble polysaccharide solution have their specific partition coefficients, minute droplets of the cellulose-rich phase contain water-soluble polysaccharide.

In order to coagulate the minute droplets, a coagulant may be used. The coagulant may be an organic solvent such as ethanol or acetone, a saline solution such as calcium salt, an inorganic acid such as hydrochloric acid or sulphuric acid, or an organic acid such as acetic acid. If viscose is used as the alkaline cellulose solution, it can also be coagulated by heating. If an acid is used for coagulation, the cellulose which is present in the alkaline cellulose solution in the form of a derivative or a metal complex, is regenerated at the same time by decomposition of a derivative or a metal complex. This is preferable because reaction is simplified and thus the cost is low. Also, if an acid is used for coagulation, it is possible to acid-hydrolyze the water-soluble polysaccharide contained in the minute droplets of cellulose-rich phase. This reduces impurities in the cellulose microspheres obtained.

After the above steps, the cellulose microspheres formed are separated from the mother liquor, water-washed and dried if necessary. They may be seperated from the mother liquor by filtering or centrifugation. Further, if viscose is used as the alkaline cellulose solution, desulfurization by sodium sulfide or bleaching by sodium hypochlorite may be carried out if necessary.

Figure 2:
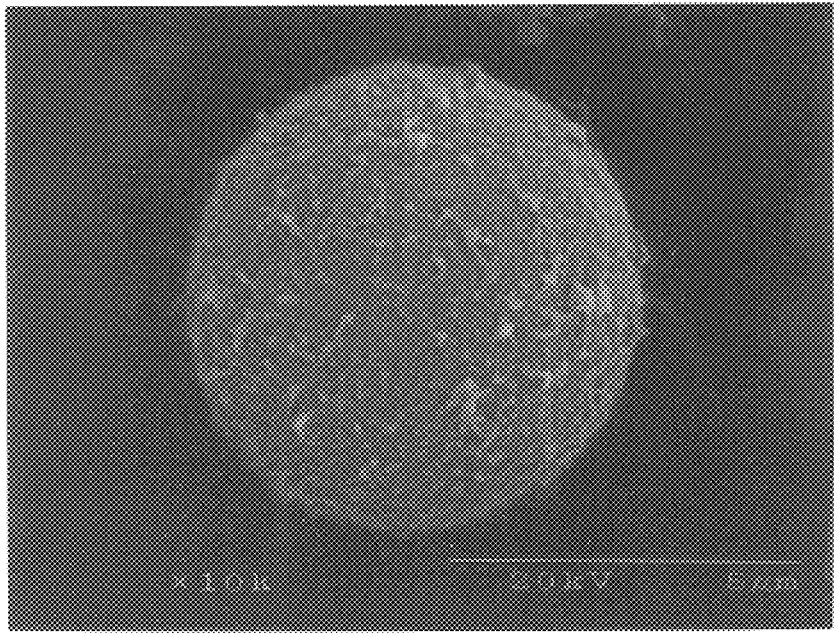
FIG. 2 is a scanning electron micrograph (×10000) of the same.

The cellulose microspheres obtained may have a smooth surface or have fine ciliary members on the surface (as shown in FIGS. 1 and 2) according to the mixing ratio of the alkaline cellulose solution and the water-soluble polysaccharide and the stirring conditions. If fine ciliary members are on the surface, the surface area of the cellulose microspheres increases. This leads to increased adsorption capacity if used as packing materials for chromatography or an adsorbent. The degree of circularity of microspheres having ciliary members varies with the state of the ciliary members. Thus, the degree of circularity should be measured as microspheres having no such ciliary members. This can be done by removing by graphic treatment the ciliary members that appear on the microspheres in the two-dimensional picture. Like smooth-surfaced microspheres, particles in which the ciliary members were removed should preferably have a degree of circularity of 0.90–1.00.

In the manufacturing steps, if a pore-forming material is added to the alkaline cellulose solution, porous cellulose microspheres are produced. Preferably, a carbonate such as calcium carbonate should be used as the pore-forming material because pores can be formed simultaneously with coagulation and regeneration of cellulose if an acid is used as the coagulant.

Examples of the invention are described below.

In the following description, it is to be understood that the notation "%" indicates weight percent. Particle sizes were measured by a laser scattering particle size distribution analyzer.

EXAMPLE 1

A 23% starch solution was prepared by adding 7.2 g of soluble starch (purchased from Nacalai Tesque) to 24.4 g of a 6% aqueous solution of sodium hydroxide while stirring at room temperature and completely dissolving it. To the solution thus formed was added 8.4 g of viscose for manufacturing cellophane (cellulose concentration: 9.5%, viscosity: 5000 centipoise, value of ammonium chloride: 6, alkali concentration: 6%). The mixture was stirred at room temperature to produce a minute dispersion in which minute droplets of cellulose-rich phase were dispersed, having a cellulose concentration of 2% and a starch concentration of 18% (cellulose: starch=1:9). 2N sulphuric acid was added to the minute dispersion to coagulate and regenerate the cellulose. The regenerated cellulose thus obtained was separated by use of a glass filter and water-washed to obtain cellulose microspheres. FIGS. 1 and 2 show scanning electron micrographs of the thus obtained cellulose microspheres.

As shown in the scanning electron micrographs, the cellulose micropheres obtained were true spheres and had a median size of 9.0 $\mu$m and a degree of circularity of 0.95.

The degree of circularity was measured by measuring the projected area of the microsphere in the scanning electron micrographs, calculating the ratio of the circumference of a circle having the same area as the projected area to the actual circumference of the microsphere on the scanning electron micrographs, and averaging the ratios for more than 20 microspheres. For cellulose microspheres having ciliary members on the surface as shown in FIG. 2, the ciliary members were removed by graphic treatment before measurement.

EXAMPLE 2

Cellulose microspheres were manufactured in the same manner as in Example 1 except that 7.2 g gum arabic (purchased from Nacalai Tesque) was used instead of soluble starch.

The cellulose microspheres obtained were true spheres and had a median size of 11.1 $\mu$m and a degree of circularity of 0.96.

EXAMPLE 3

Cotton linter as a cellulose material was dissolved in a cuprammonium solution to prepare a cellulose cuprammonium solution having a copper concentration of 4.0%, an ammonium concentration of 9.8% and a cellulose concentration of 5.7%. Cellulose microspheres were manufactured in the same manner as in Example 1 except that the cellulose cuprammonium solution was used instead of viscose.

The cellulose microspheres obtained had a spherical form and had a median size of 8.4 $\mu$m and a degree of circularity of 0.92.

Control 1

Figure 3:
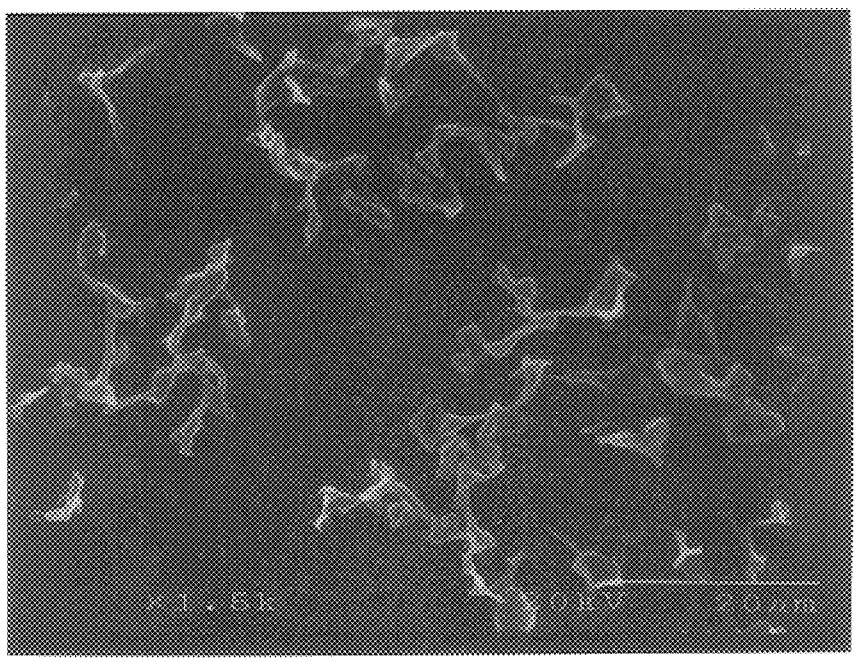
FIG. 3 is a scanning electron micrograph (×1500) of cellulose particles obtained in Comparative Example 1.
Figure 4:
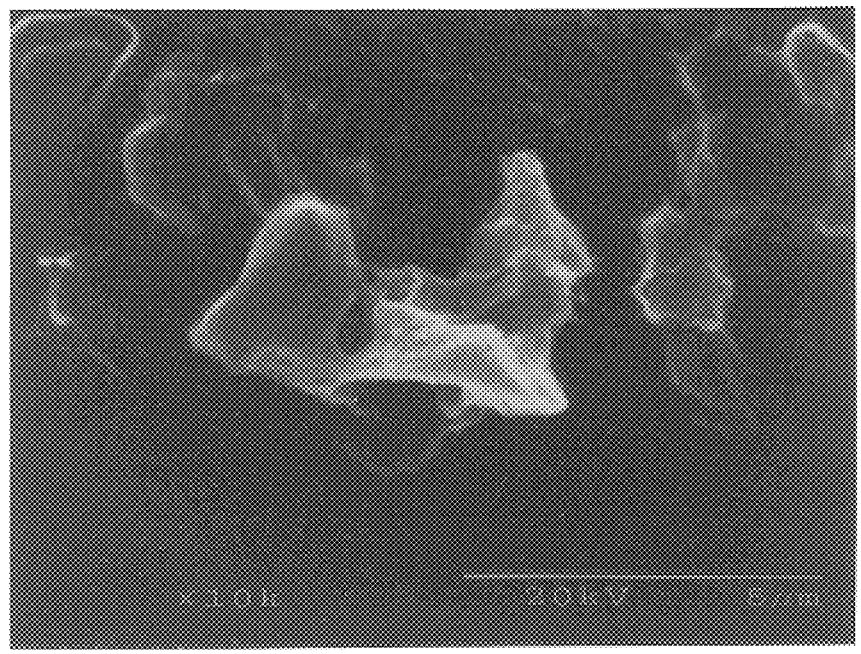
FIG. 4 is a scanning electron micrograph (×10000) of the same.

Instead of soluble starch, a 10% polyacrylamide solution (purchased from Nacalai Tesque) was mixed with viscose used in Example 1 to prepare a mixed dispersion containing 1% of cellulose and 9% of polyacrylamide. The mixed dispersion was stirred at room temperature and 2N sulphuric acid was added thereto to yield regenerated cellulose. FIGS. 3 and 4 show scanning electron micrographs of the thus regenerated cellulose.

As is apparent from the scanning electron micrographs, the regenerated cellulose obtained was of indeterminate form and no spherical particles were obtained.

Further, polyacrylamide was found remaining in the regenerated cellulose by 15% (to the regenerated cellulose).

Control 2

A viscose-starch mixture dispersion was prepared in the same manner as in Example 1 except that the cellulose concentration was 6.7% and the soluble starch concentration was 13.3%.

When the mixed dispersion was observed under an optical microscope, no cellulose-rich phase was found to be dispersed in a starch-rich phase. Also, in the regenerated cellulose produced in the same manner as in Example 1, no spherical particles were found.

Results

In Examples 1–3, completely spherical cellulose microspheres were obtained.

In contrast, in Control 1 in which polyacrylamide as a water-soluble polymer was used instead of water-soluble polysaccharide, no spherical particles were obtained. In Control 2, too, no spherical particles were obtained because the mixing ratio of the cellulose content and the water-soluble polysaccharide was not appropriate.

According to this invention, by properly selecting the mixing conditions of the alkaline cellulose solution and the water-soluble polysaccharide, completely spherical cellulose microspheres can be produced with extreme ease.

Since a water-soluble polysaccharide is used, it is possible to prevent any water-soluble polysaccharide from remaining in the cellulose microspheres by acid-hydrolysis.

What is claimed is:

1. A method of manufacturing cellulose microspheres having a particle size of 1–100 μm, said method comprising mixing an alkaline cellulose solution with a water-soluble polysaccharide which remains water-soluble in an acid, so that the mixture will contain at least three parts by weight of the water-soluble polysaccharide to one part by weight of cellulose content in the alkaline cellulose solution, to prepare a minute dispersion in which are formed minute droplets made of cellulose-rich phase and bringing the minute dispersion into contact with an acid to coagulate and regenerate said minute droplets.

2. The method as claimed in claim 1 wherein the total concentration of the cellulose content in said alkaline cellulose solution and said water-soluble polysaccharide is 5–30 wt %.

3. The method as claimed in claim 1 wherein said alkaline cellulose solution is a viscose.

4. The method as claimed in claim 2 wherein said alkaline cellulose solution is a viscose.

* * * * *